E. C. JACOBSON.

FUEL BURNING APPARATUS.

APPLICATION FILED NOV. 22, 1921.

Reissued Feb. 7, 1922. 15,281.

Inventor

Era C. Jacobson

By his Attorney

Richard Eyre

UNITED STATES PATENT OFFICE.

ERA C. JACOBSON, OF CHICAGO, ILLINOIS, ASSIGNOR, BY MESNE ASSIGNMENTS, TO AMERICAN STEAM TRUCK COMPANY, OF CHICAGO, ILLINOIS, A CORPORATION OF DELAWARE.

FUEL-BURNING APPARATUS.

15,281. Specification of Reissued Letters Patent. Reissued Feb. 7, 1922.

Original application filed March 29, 1920, Serial No. 369,800. Renewed May 9, 1921, Serial No. 468,046. Original No. 1,391,385, dated September 20, 1921. Application for reissue filed November 22, 1921. Serial No. 517,089.

*To all whom it may concern:*

Be it known that I, ERA C. JACOBSON, a citizen of the United States, and residing at 1414 Thorndale Avenue, Chicago, Cook County, Illinois, have invented certain new and useful Improvements in Fuel-Burning Apparatus, of which the following is a specification.

My invention relates to fuel burning apparatus and has for one of its objects the provision of simple and efficient means for starting and controlling the burning of fuel for tubular boilers, and the like.

A further object is the provision of simple and efficient means for causing the fuel to automatically operate an electrical switch member for closing first an ignition circuit and then a blowing circuit in fuel burning mechanism.

A still further object is the provision of simple and efficient means for first igniting fuel and then blowing the flame caused by the burning fuel.

Other objects will appear hereinafter.

An embodiment of my invention is illustrated in the accompanying drawing, forming a part of this specification, and in which:—

Figure 1:
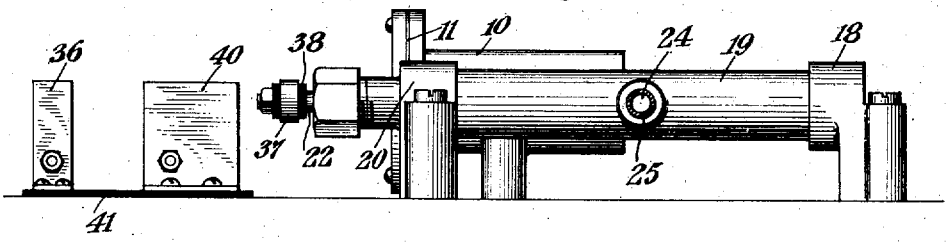
Figure 1 is a side elevation of mechanism embodying my invention.

Referring more particularly to the drawing, I have indicated a valve casing having a valve seat therein with a vale 6 mounted for cooperation with said seat 5. The valve casing may be provided with a suitable stuffing box 7 for preventing the passage of fuel out around the stem 8 of the valve 6. Extending from the valve casing is a fuel pipe 8 adapted for connection with a source of fuel under pressure, not shown.

The stem 8 extends into a housing 10 in which is mounted a diaphragm 11. Resting against the diaphragm 11, at one side, is a head 12 secured to the stem 8. At the other side of the diaphragm 11 connected in the housing 10 is a supply pipe 13 adapted to be connected with steam under pressure so that steam coming through said pipe may press against the diaphragm 11.

I preferably mount the stem 8 in an adjustable bearing 14 in the housing 10 with a washer 15 on the inner end of the adjusting member 14. Between the washer 15 and a portion of the head 12 is a coil spring 16. The spring presses the head 12 toward the diaphragm and normally holds the valve 6 off its seat 5. When the steam pressure in pipe 13 exceeds the strength of spring 16 diaphragm 11 will move the stem 8 and valve 6 to close said valve against its seat 5 and cut off the passage of fuel from pipe 9.

Extending from the valve casing is a pipe 17 which connects with a cylinder head 18 so that fuel passing through valve seat 5 can pass on through pipe 17 to the interior of cylinder head 18.

Attached to the cylinder head 18 is a cylinder 19 and at the other end of the cylinder 19 is a cylinder head 20. Disposed within the cylinder 19 is a piston 21 having a piston rod 22 extending out through head 20 through a packing gland 23.

Intermediate the ends of the cylinder 19 is an exhaust port 24 which is connected by means of a pipe 25 with a fuel spraying nozzle 26 and the latter disposed within a mixing chamber 27. In operation the fuel coming through pipe 17 presses against piston 21, pressing the latter against a spring 28 around the piston rod 22 until said head 21 uncovers the port 24. When the piston 21 has uncovered port 24 the fuel is free to pass to nozzle 26.

Figure 2:
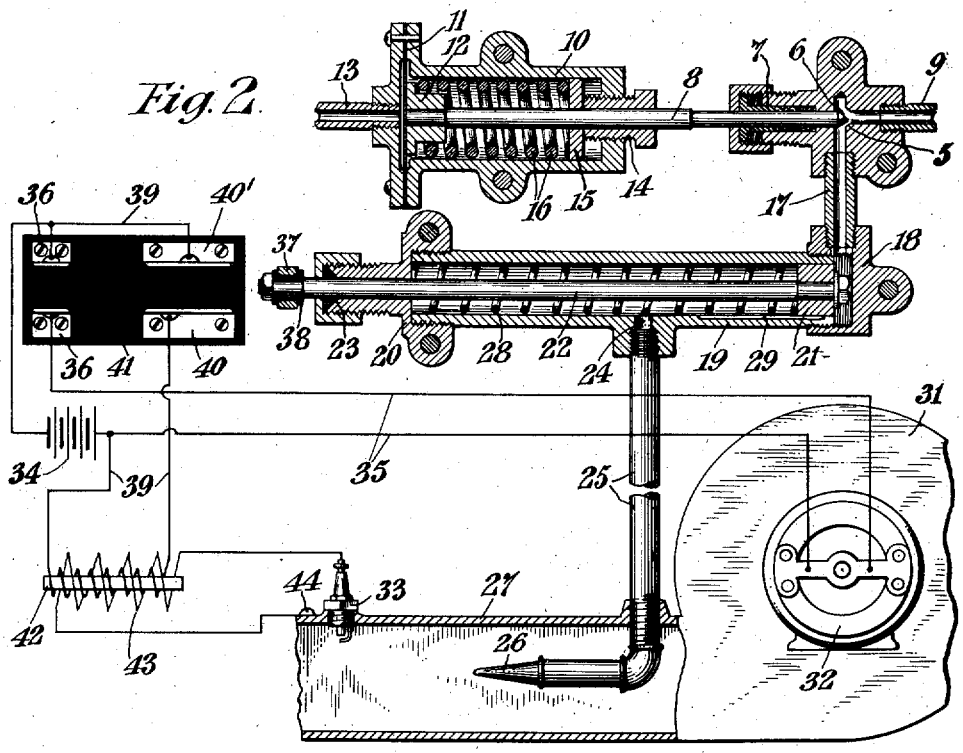
Figure 2 is a top view partly in section and partly diagrammatical of fuel burning apparatus embodying my invention.
Figure 3:
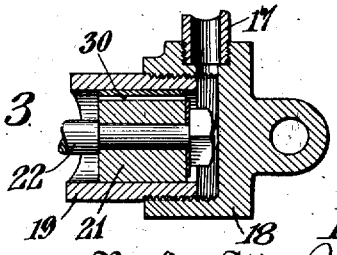
Figure 3 is an enlarged fragmental section showing a different form of by-pass mechanism used in the construction.

I find it advisable to provide some form of by-pass in the cylinder 19 so that the piston 21 can be returned to the position shown, after having uncovered port 24, by the spring 28. In Fig. 2 I have shown a small groove 29 as being cut in the wall of the cylinder from a point near the end of cylinder 19 in head 18 to a point near the exhaust port 24 so that after fuel valve 6 is closed spring 28 can force the head 21 down to its position shown and the fuel between the head 21 and valve 6 can pass out through the groove 29 into pipe 25 and nozzle 26. It will be apparent that many forms of by-pass arrangements may be provided. In Fig. 3 I have shown a small perforation 30 in the head 21 to permit the fuel trapped between head 21 and valve 6, when the latter is closed, to pass out and permit spring 28 to move the head 21 to the position shown.

I have indicated the nozzle 26 as being mounted in a passage 27 leading from a blower 31 which may be of the centrifugal type having an electric motor 32 connected directly to said blower. Any other form of blower may be substituted when so desired. Also, in the wall 27 of the mixing chamber I have indicated a spark plug 33 of conventional construction mounted in a position to fire fuel blown from nozzle 26.

The motor 32 may be operated from an electric battery 34 having a circuit 35 which includes said battery and motor. Also, in the circuit 35 are two contacts 36, and mounted on the piston rod 22 is a switch member 37 mounted in a suitable manner with insulation 38 insulating said member 37 from the piston rod. As the piston rod 21 moves to uncover port 24, contact member 37 passes between contact members 36, thereby closing the circuit 35 and causing the motor 32 to operate the blower 31.

An electrical ignition circuit is also provided. The primary circuit 39 of the ignition circuit has one leg connected to battery 34 and the other leg connected to a contact 40 on an insulated base 41 upon which the contacts 36 are mounted. Also, on base 41 is a contact member 40′, and the contacts 40 and 40′ are connected in circuit 39 so that as the switch member 37 moves toward contacts 36 it will pass between contacts 40 and 40′ causing a circuit to pass through the primary winding of an induction coil 42. The secondary winding 43 of the induction coil is connected to the spark plug 33 and a suitable part of the framework, such as at 44, to the wall 27.

When it is desired to start a fire in a device equipped with this improvement, fuel under considerable pressure is introduced through pipe 9 to valve 6 which normally would be open, permitting the fuel to pass on through pipe 17 and head 18, pressing the piston 21 against the influence of spring 28 until port 24 was uncovered when the fuel would pass on to nozzle 26 and be sprayed in a very fine vapor or spray into the chamber inclosed by walls 27. As the piston 21 moves down toward port 24, the piston rod 22 moves switch member 37 between contacts 40 and 40′, closing circuit 39 and causing sparks in the spark plug 33. The by-pass permits a small amount of fuel to begin passing to nozzle 26 as soon as or shortly after the piston 21 starts in its movement toward head 20 and this fuel issues from nozzle 26. The sparks produced in spark plug 33 ignite such fuel. When the piston 21 has traveled a sufficient distance the switch member 37 will pass from between contacts 40 and 40′ to a position between contacts 36, thereby breaking the ignition circuit and closing the circuit 35 to the motor operating the blower 31. The device will then stay in this position until sufficient steam pressure has been raised to operate the diaphragm 11 to overcome the strength of spring 16 and move valve 6 against its seat 5 to close the passage of fuel from pipe 9. As soon as the pressure between valve 6 and piston 21 is reduced by closing valve 6, spring 28 begins to move the piston 21 toward the position shown and the fuel trapped between said piston 21 and valve 6 passes out through the by-pass and out of nozzle 26, permitting spring 28 to move the piston and piston rod back to the position indicated in Fig. 2. As soon as the pressure of steam in pipe 13 falls sufficiently, spring 16 will press the diaphragm outwardly and open the valve 6 again, permitting another cycle of movement, such as just described. Thus the fire will be automatically controlled to maintain a substantially even steam pressure in pipe 13 until the supply of fuel is cut off from pipe 9.

Having thus fully described my invention what I claim as new and desire to secure by Letters Patent is:—

1. Fuel burning apparatus comprising a blower circuit; an ignition circuit; contacts in said circuits; a switch member; and a member operable by fuel under pressure, connected with said switch member and adapted to move the latter from one of said contacts to the other.

2. Fuel burning apparatus comprising a fuel valve; a fuel nozzle; fuel conducting means between said valve and nozzle; a blower circuit; an ignition circuit, both of said circuits being normally open; and means operable by fuel in said fuel conducting means for closing said circuits, one at a time.

3. Fuel burning apparatus comprising a blower circuit; an ignition circuit; contacts in said circuit; a cylinder; a piston in said cylinder; a piston rod attached to said piston; a switch member on said piston rod; and means for conducting fuel under pressure to said piston for moving said switch member from the contact in one circuit to the contact in said other circuit.

4. Fuel burning apparatus comprising a blower circuit; an ignition circuit; contacts in said circuits; a cylinder; a piston in said cylinder; a piston rod attached to said piston; a switch member on said piston rod; means for conducting fuel under pressure to said piston for moving said switch member from the contact in one circuit to the contact in said other circuit; and resilient means for moving said switch member from the last-mentioned contact member back to the first-mentioned contact member upon fuel being cut off from said piston.

5. Fuel burning apparatus comprising a fuel valve; a burner; a cylinder having spaced intake and exhaust ports therein with the intake port in communication with said fuel valve and the exhaust port in communication with said burner; a piston in the cylinder; a spring normally holding the piston between said ports; and a bypass affording a communication in the cylinder from one side to the other of the piston.

6. Fuel burning apparatus comprising a fuel valve; a cylinder having spaced-apart intake and exhaust ports therein with the intake port in communication with said fuel valve; a piston in the cylinder; a spring normally holding the piston between said ports; a bypass affording a communication from one side to the other of the piston in said cylinder; an ignition circuit; and a switch member operable by said piston for opening and closing the ignition circuit.

7. Fuel burning apparatus comprising a cylinder having an intake port at one end and an exhaust port intermediate its ends; a piston in said cylinder; a spring tending to hold said piston near the intake end of said cylinder; means for conducting fuel under pressure to said piston for moving the latter against said spring to uncover said exhaust port; an ignition circuit; a blower circuit; contacts in said ignition and blower circuits; and a switch member operable by said piston for moving said switch member from one of said contact members to the other thereof.

8. Fuel burning apparatus comprising a fuel valve; a cylinder connected with said fuel valve and having an exhaust port therein; a piston in said cylinder; a piston rod attached to said piston and extending axially from said cylinder; a plurality of electrical contacts adjacent the path of said piston rod; a switch member carried by said piston rod and adapted to engage said contacts; a blower circuit including certain of said contacts; an ignition circuit including certain other of said contacts; a spring tending to move said piston toward one end of said cylinder; means for closing said fuel valve; and by-pass means permitting the fuel trapped between said piston and said fuel valve to pass by said piston to the exhaust port of said cylinder.

9. Fuel burning apparatus comprising a fuel valve; a stem on the fuel valve; a diaphragm at an end of the valve stem adapted to close said fuel valve; a spring tending to press said stem toward the diaphragm and hold the valve open; a cylinder connected with the valve and having an exhaust port intermediate its ends; a piston in the cylinder; a spring tending to hold the piston adjacent one end of the cylinder; means for conducting fuel under pressure connected with the fuel valve so that said piston is moved against the action of its adjacent spring to uncover said exhaust port, the last-mentioned spring being adapted to move the piston back over said exhaust port upon the fuel valve being closed.

10. Fuel burning apparatus comprising a blower circuit; an ignition circuit; contacts in said circuit; a cylinder; a piston in said cylinder; a piston rod attached to said piston; a switch member on said piston rod; and means for conducting fuel under pressure to said piston for moving said switch first to the contact in said ignition circuit and next to the contact in the blower circuit.

11. A liquid fuel burning apparatus, including a fuel spraying device together with means for initially supplying fuel to the apparatus in an atmosphere insufficient for complete combustion, and means responsive to the flow of fuel to the apparatus for initiating an air supply for more complete combustion, for the purpose set forth.

12. A liquid fuel burning apparatus, including an ignition device, a nozzle pointing towards said ignition device, means for causing the fuel to flow through said nozzle to said ignition device and means dependent upon the fuel pressure supplied to the nozzle for initiating and producing an air blast directed towards the ignited fuel whereby the ignition of the fuel takes place under conditions of an insufficient supply of air for complete combustion.

13. A liquid fuel burning apparatus, including an ignition device, a nozzle pointing towards said ignition device, means for causing the fuel to flow through said nozzle to said ignition device, means for supplying air to the ignited fuel to complete combustion, and means dependent upon the fuel pressure supplied to said nozzle for initiating the operation of the said air supply means whereby the ignition of the fuel takes place under conditions of an insufficient supply of air for complete combustion.

14. A liquid fuel burning apparatus comprising a closed chamber, a fuel supply device adapted to supply fuel under pressure to said closed chamber, means for supplying fuel under pressure to the supply device, means for initially igniting the supplied fuel, and means dependent upon the pressure of the fuel supplied to the supply device for supplying an air blast into the inclosed chamber and to the ignited fuel for complete combustion, whereby the ignition of the fuel takes place under conditions of an insufficient supply of air for complete combustion.

15. A liquid fuel burning apparatus comprising a conduit, a fuel nozzle disposed axially therein and adapted to supply a stream of fuel under pressure in the direction of the conduit, a valve or control device for supplying fuel under pressure to said nozzle, an ignition device disposed in said conduit and in a position to ignite the fuel issuing from said nozzle and a blower dependent in its operation upon the pressure of the fuel supplied to the nozzle for supplying an air blast into the conduit and to the ignited fuel for complete combustion, whereby the ignition of the fuel takes place under conditions of an insufficient supply of air for complete combustion and the air for complete combustion is subsequently supplied thereto.

16. A liquid fuel burning apparatus comprising a conduit, a blower for supplying said conduit with a blast of air and an electric motor for driving said blower, a circuit for said motor, a fuel nozzle disposed in the conduit and having its nozzle pointing in the direction of draft, an ignition device disposed in the conduit and substantially in a position where it is impinged by the fuel issuing from the nozzle, a control device for supplying fuel under pressure to said nozzle and an electric controller actuated by the pressure of the fuel supplied to the nozzle for closing the motor circuit, subsequent to the supply of fuel to the nozzle.

In testimony whereof I have signed my name to this specification.

ERA C. JACOBSON.